(12) United States Patent
Foo et al.

(10) Patent No.: US 9,150,177 B2
(45) Date of Patent: Oct. 6, 2015

(54) APPARATUS AND METHOD FOR DETECTING VEHICLE ROLLOVER USING ENHANCED SENSOR INPUTS AND PROCESSING ARCHITECTURE

(75) Inventors: Chek-Peng Foo, Ann Arbor, MI (US); Huahn-Fern Yeh, Novi, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 1945 days.

(21) Appl. No.: 12/299,754

(22) PCT Filed: May 11, 2007

(86) PCT No.: PCT/US2007/011360
§ 371 (c)(1),
(2), (4) Date: Nov. 5, 2008

(87) PCT Pub. No.: WO2007/133666
PCT Pub. Date: Nov. 22, 2007

(65) Prior Publication Data
US 2009/0105899 A1    Apr. 23, 2009

Related U.S. Application Data

(60) Provisional application No. 60/799,850, filed on May 11, 2006.

(51) Int. Cl.
*B60R 21/00* (2006.01)
*B60R 21/0132* (2006.01)

(52) U.S. Cl.
CPC ..... *B60R 21/0132* (2013.01); *B60R 2021/0018* (2013.01); *B60R 2021/01327* (2013.01)

(58) Field of Classification Search
USPC .......................... 701/29, 36, 38, 45
See application file for complete search history.

(56) References Cited

U.S. PATENT DOCUMENTS

| | | | |
|---|---|---|---|
| 6,192,305 B1 * | 2/2001 | Schiffmann | 701/45 |
| 6,433,681 B1 | 8/2002 | Foo et al. | |
| 6,600,414 B2 | 7/2003 | Foo et al. | |
| 7,057,503 B2 * | 6/2006 | Watson | 340/440 |
| 7,162,343 B2 * | 1/2007 | Subbian et al. | 701/45 |
| 2003/0093201 A1 * | 5/2003 | Schubert et al. | 701/46 |
| 2004/0128060 A1 * | 7/2004 | Park | 701/124 |
| 2005/0033486 A1 * | 2/2005 | Schmitt et al. | 701/1 |
| 2006/0064218 A1 * | 3/2006 | Subbian et al. | 701/45 |
| 2006/0184299 A1 * | 8/2006 | Wu et al. | 701/45 |
| 2006/0253240 A1 * | 11/2006 | Rao et al. | 701/48 |
| 2007/0067085 A1 * | 3/2007 | Lu et al. | 701/70 |

FOREIGN PATENT DOCUMENTS

GB        2 419 213 A    4/2006

OTHER PUBLICATIONS

Kroninger et al., "A New Sensing Concept for Tripped Rollover", *SAE International*, 04B-30-DRAFT-Version Oct. 17, 2003.
Supplementary European Search Report dated Jul. 9, 2010 for European Patent Application No. 07794758.8, filed May 11, 2007.

* cited by examiner

*Primary Examiner* — John R Olszewski
*Assistant Examiner* — Truc M Do
(74) *Attorney, Agent, or Firm* — Tarolli, Sundheim, Covell & Tummino LLP

(57) ABSTRACT

The present invention relates to an occupant protection system and, more particularly, to an apparatus and method for detecting a vehicle rollover event using and enhanced sensor input architecture that uses both a roll over sensor and an electronic stability control system.

4 Claims, 15 Drawing Sheets

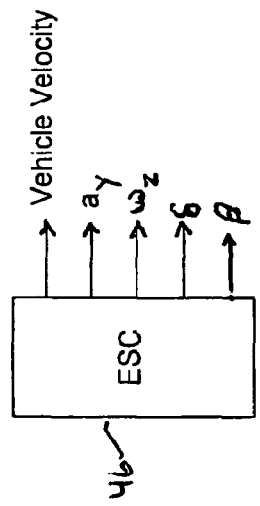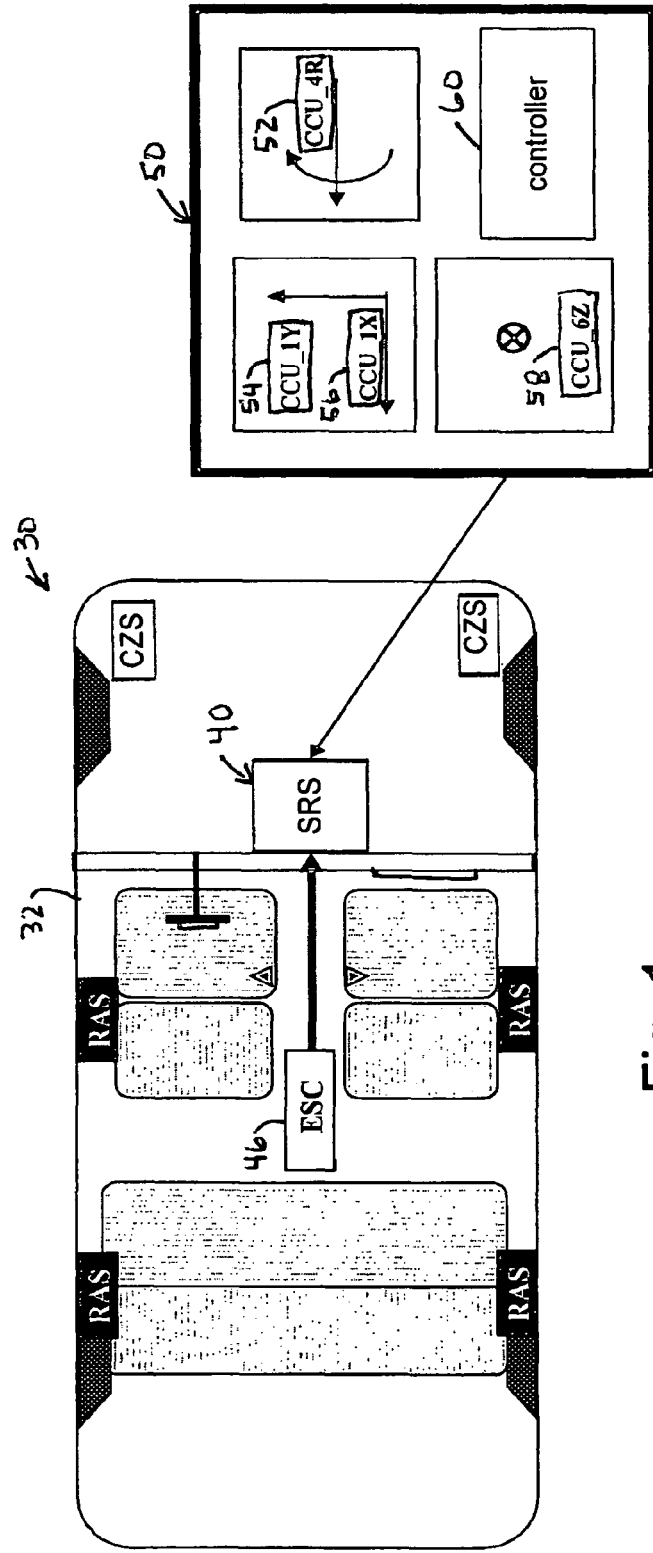

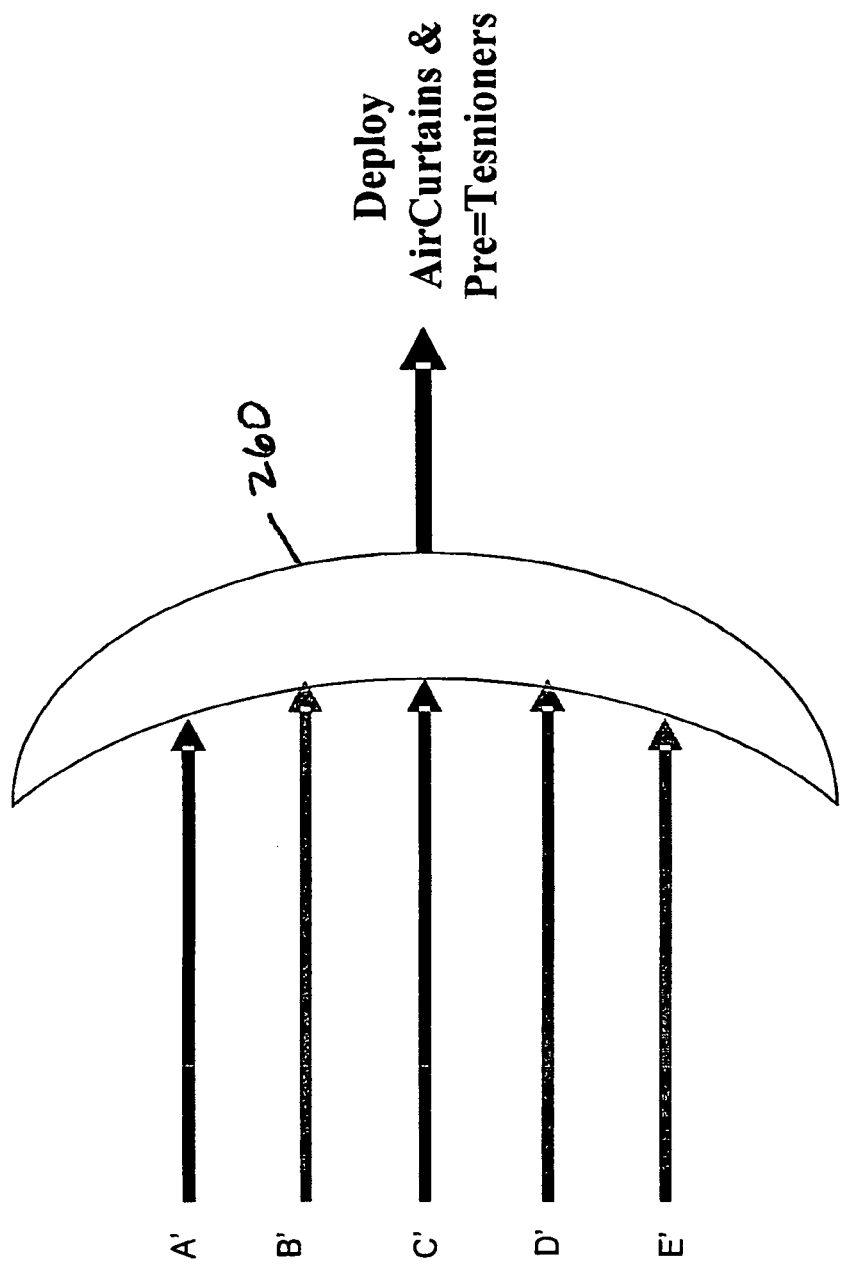

APPARATUS AND METHOD FOR DETECTING VEHICLE ROLLOVER USING ENHANCED SENSOR INPUTS AND PROCESSING ARCHITECTURE

RELATED APPLICATION

This application claims priority from U.S. provisional patent application Ser. No. 60/799,850, filed on May 11, 2006, the subject matter of which is incorporated herein by reference.

TECHNICAL FIELD

The present invention relates to an occupant protection system and, more particularly, to an apparatus and method for detecting a vehicle rollover event using an enhanced sensor input and processing architecture.

BACKGROUND OF THE INVENTION

To detect a vehicle rollover event, a vehicle may be equipped with one or more sensors that detect vehicle dynamics. The sensors are connected to a controller that evaluates the sensor signals and controls actuation of one or more actuatable devices in response to a determined occurrence of a vehicle rollover event.

U.S. Pat. No. 6,600,414, to Foo et al. discloses an apparatus and method for detecting a vehicle rollover event using both a discriminating and a safing function.

U.S. Pat. No. 6,433,681 to Foo et al., discloses an apparatus and method for detecting vehicle rollover event having a roll-rate switched threshold.

SUMMARY OF THE INVENTION

In accordance with the present invention, an apparatus and method are provided for detecting a vehicle rollover event using an enhanced sensor input and processing architecture.

An apparatus is provided for detecting a vehicle rollover event comprising an enhanced sensor input and processing architecture and a controller responsive to the enhanced sensor input architecture for controlling an occupant restraining device.

A method is provided for detecting a vehicle rollover event comprising the steps of monitoring vehicle roll rate as a function of roll angle to determine if an associated threshold value is exceeded. The method also includes monitoring lateral acceleration of the vehicle and determining if the lateral acceleration of the vehicle exceeds a value. The method also determines if a rollover condition is likely in response to the monitored lateral acceleration and the roll rate as a function of roll angle and output a first determination signal and monitors an electronic stability control system of the vehicle. The method also includes the steps of determining if the electronic stability control system indicates a vehicle rollover condition and output a second determination signal and controlling and actuatable restraining device in response to the first and second determination signals.

BRIEF DESCRIPTION OF THE DRAWINGS

The invention will be understood by one skilled in the art upon consideration of the following description of an exemplary embodiment of the invention and the accompanying drawings, in which:

FIG. 1 is a schematic diagram of a vehicle having a rollover sensing system with enhanced sensor inputs and processing in accordance with one example embodiment of the present invention; and FIGS. 2-16 are schematic functional block diagrams showing details of the rollover system with enhanced sensor inputs and processing in accordance with one example embodiment of the present invention.

DESCRIPTION OF AN EXEMPLARY EMBODIMENT

Figure 2:
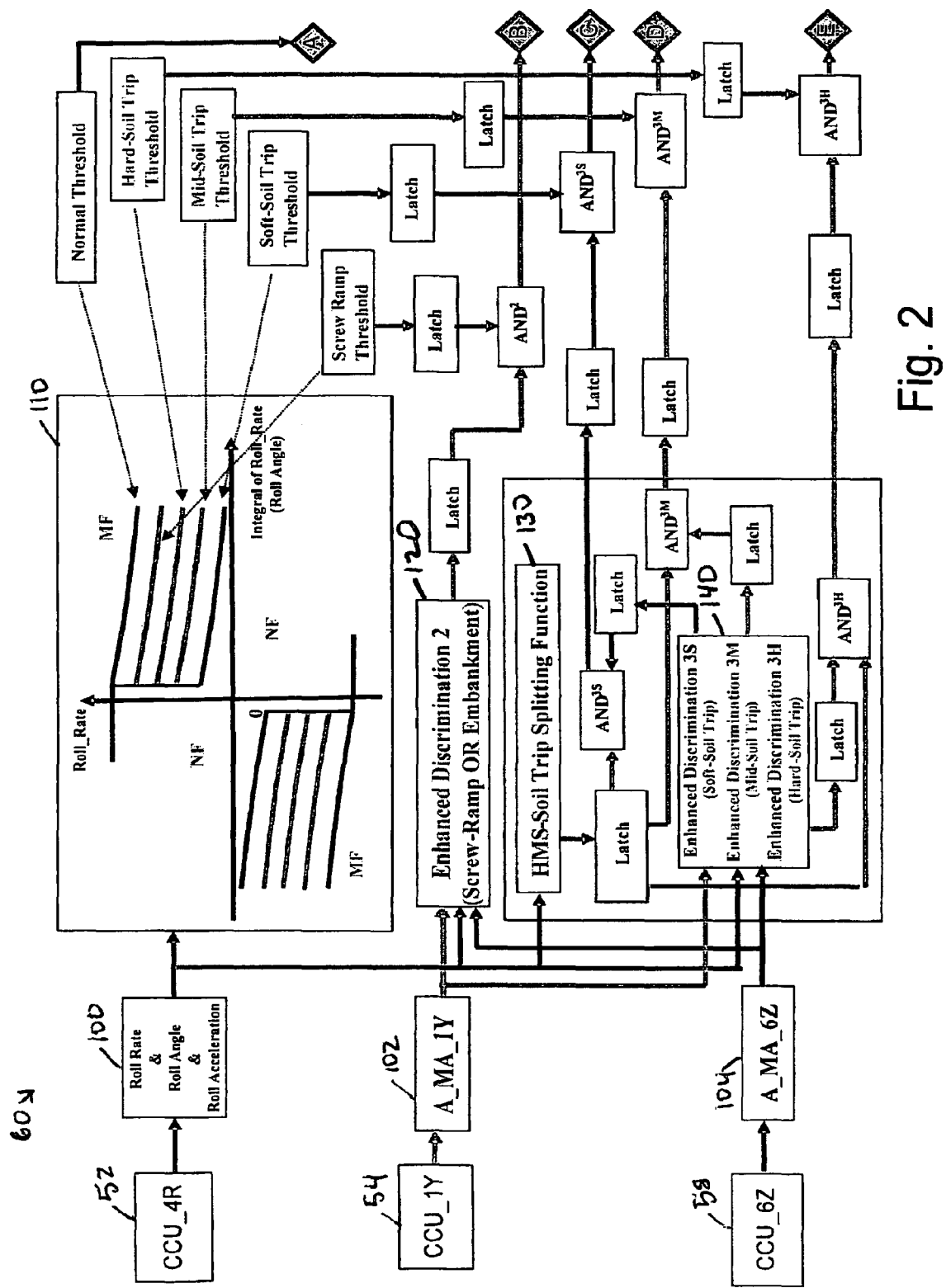
Figure 4:
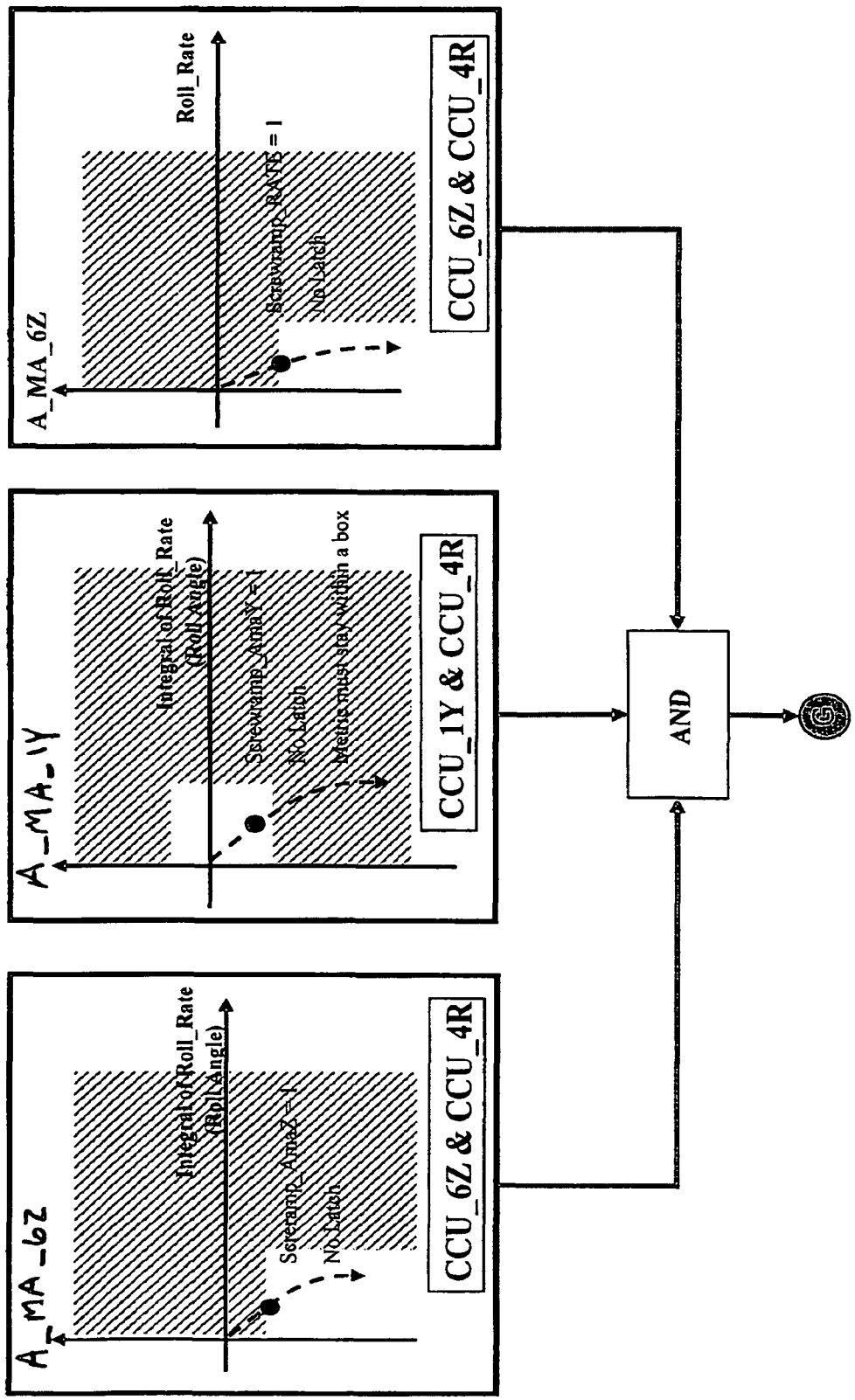

Referring to FIG. 1, an example embodiment of an occupant rollover protection system 30 in accordance with the present invention is illustrated. The rollover protection system 30 is mountable in a vehicle 32. The vehicle 32 includes two systems for enhancing vehicle safety, that being a supplemental restraint system ("SRS") 40 and an electronic stability control ("ESC") system 46.

The supplemental restraint system 40 includes a sensor assembly 50 having a rollover discrimination sensor 52. The sensor 52 senses one or more vehicle operating characteristics or conditions that might indicate the occurrence of a vehicle rollover event. The rollover discrimination sensor 52 provides an electrical signal CCU_4R having a characteristic based on the sensed vehicle operating characteristic(s). By way of example, the vehicle rollover discrimination sensor 52 is a roll-rate sensor operative to sense angular rotation of the vehicle 30 about a front-to-rear axis of the vehicle through the center of the vehicle known in the art as the vehicle's X-axis. The vehicle rollover discrimination sensor 52 may be mounted at or near a central vehicle location in the vehicle 30 and oriented so as to sense a rate of vehicle rotation about the X-axis of the vehicle 30.

More particularly, the rollover discrimination sensor 52 could be a micro-miniature structure configured to sense angular velocity (e.g., roll-rate) of the vehicle and fabricated using semiconductor manufacturing techniques. When sensing a rate of angular rotation in a first direction about its axis of sensitivity, a DC output voltage from the rollover discrimination sensor 52 is positive. Similarly, an angular rate of rotation in the other direction about the sensor' axis of sensitivity provides a negative sensor output voltage. Thus, when mounted in the vehicle, the output signal of rollover discrimination sensor 52 indicates angular velocity of the vehicle, including magnitude and angular direction, about the sensor's axis of sensitivity. The axis of sensitivity of the rollover discrimination sensor 52 is coaxial with the front-to-rear X-axis of the vehicle 30 through the center of the vehicle. Those skilled in the art will appreciate that the angular velocity about the vehicle's front-to-rear axis is the same as its roll-rate or rate of rotation of the vehicle 30.

Also, the sensor assembly 50 includes a Y-axis acceleration sensor 54 that senses acceleration of the vehicle in the vehicle's sideways direction or in the Y-axis of the vehicle. The Y-axis acceleration sensor 54 outputs an electrical signal CCU_1Y having an electrical characteristic indicative of crash acceleration of the vehicle in the Y direction. The sensor assembly 50 further includes an X-axis acceleration sensor 56 that senses acceleration of the vehicle in the vehicle's forward and rearward directions or in the X-axis of the vehicle. The X-axis acceleration sensor 56 outputs an electrical signal CCU_1X having an electrical characteristic indicative of crash acceleration of the vehicle in the X direction. The sensor assembly 50 also includes a Z-axis acceleration sensor 58 that senses acceleration of the vehicle in the vehicle's up and down direction or in the Z-axis of the vehicle. The Z-axis acceleration sensor 58 outputs an electrical signal CCU_6Z having an electrical characteristic indicative of crash acceleration of the vehicle in the Z direction.

A controller 60 of the supplemental restraint control system 40, monitors all sensor signals from the sensor assembly 50, i.e., CCU_4R, CCU_1Y, and CCU_6Z, and controls appropriate actuatable restraining devices such as front airbags, side air curtains, seat belt pretensioners, etc. useful in attempting to aid in protection of an occupant during a rollover event. The controller 60, for example, is a microcomputer programmed to perform the operations or functions in accordance with an example embodiment of the present invention. Such functions alternatively could be performed with discrete circuitry, analog circuitry, a combination of analog and discrete components, and/or an application specific integrated circuit.

The ESC 46 is operatively connected to the supplemental restraining system 40 to provide other inputs to enhance the detection of a vehicle rollover condition and therefore, make the control of the restraining system in response to a rollover condition more robust. The ESC system (See FIG. 3) is of the type typically known in the art that outputs several sensed vehicle operating parameters, i.e., vehicle velocity signal, vehicle lateral acceleration signal $a_y$, steer angle signal $\delta$, vehicle yaw rate signal $\omega_z$, and vehicle side slip angle signal $\beta$.

In accordance with the present invention, lateral force induced rollover events, such as encountered during a double lane change, a J-turn, etc, involves transient coming maneuvers that excite the vehicle roll mode. In this type of event, vehicle lateral acceleration $a_y$ and steering angle $\delta$ can be used to improve the robustness of rollover detection. Also, yaw instability induced rollover events such as soil-trip, and curb-trip events, involves the saturation of tire forces that brings the vehicle into uncontrollable sliding. In this type of event, vehicle yaw rate $\omega_z$ and side slip angle $\beta$ can be used to improve the robustness of rollover detection. Steer angle $\delta$ and vehicle yaw rate $\omega_z$ can be used to improve the robustness of embankment logic. In any rollover event, sufficient large vehicle velocity is a necessary factor.

Referring to FIGS. 2-16, the control processing using enhanced sensor inputs will be appreciated. The teachings of U.S. Pat. No. 6,433,681 to Foo et al., entitled APPARATUS AND METHOD FOR DETECTING VEHICLE ROLLOVER HAVING ROLL-RATE SWITCHED THRESHOLD is hereby incorporated herein by reference. The roll rate sensor signal CCU_4R from the roll rate sensor 52, is connected a roll rate, roll angle (integral of roll rate), and roll acceleration determining function 100 within the controller 60. The CCU_1Y signal from the Y accelerometer 54 is connected to a moving-average determining function 102 of controller that sums a predetermined number of sampled acceleration signals to determine a moving average value A_MA_1Y value of the side ways acceleration sensed by sensor 54. The CCU_6Z signal from the Z accelerometer 58 is connected to a moving-average determining function 104 of controller that sums a predetermined number of sampled acceleration signals to determine a moving average value A_MA_6Z value of the acceleration sensed in the Z-axis by sensor 58.

A plurality of predetermined threshold values are defined by roll rate values as a function of roll angle values. These thresholds are depicted in graph 110 of FIG. 2. A highest level threshold is said to be a normal threshold value that decreases slightly as roll rate increases. A screw ramp threshold is a first threshold level below the normal threshold level. A second threshold level is two steps below normal for a hard-soil condition. A third threshold level is below the first two representing a mid-soil threshold. Finally, a soft-soil threshold is the lowest threshold available in this control scheme in accordance with one exemplary embodiment of the preset invention. The upper right quadrant represents a rollover in one direction and the lower left quadrant in a rollover in the other direction. If a value of roll rate as a function roll angle exceeds its associated threshold, the "A" value goes to a digital HIGH. If the other associated threshold values are exceeded for hard soil, mid soil, soft soil and a screw ramp, that condition is latched HIGH.

Figure 5:
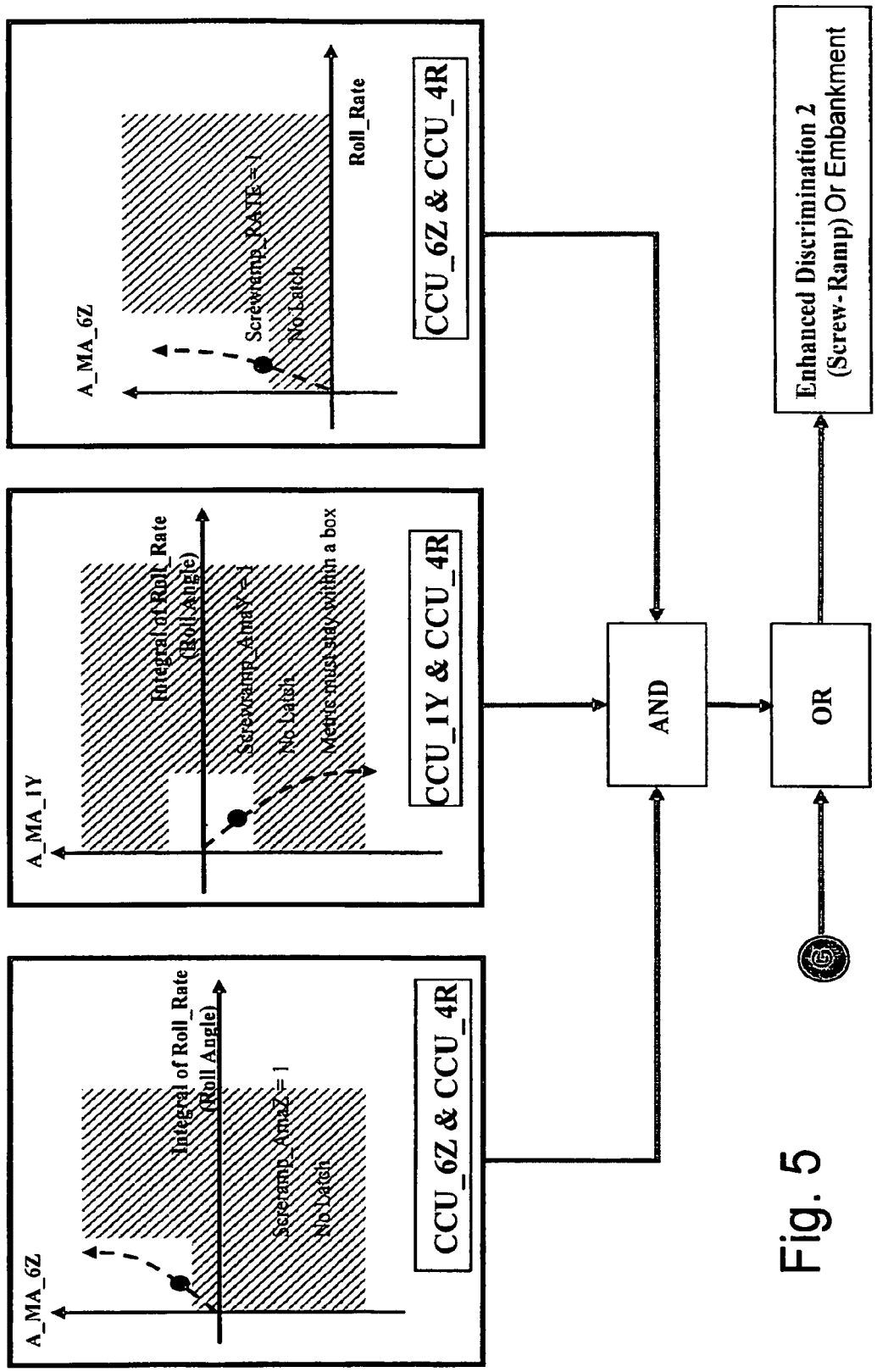
Figure 6:
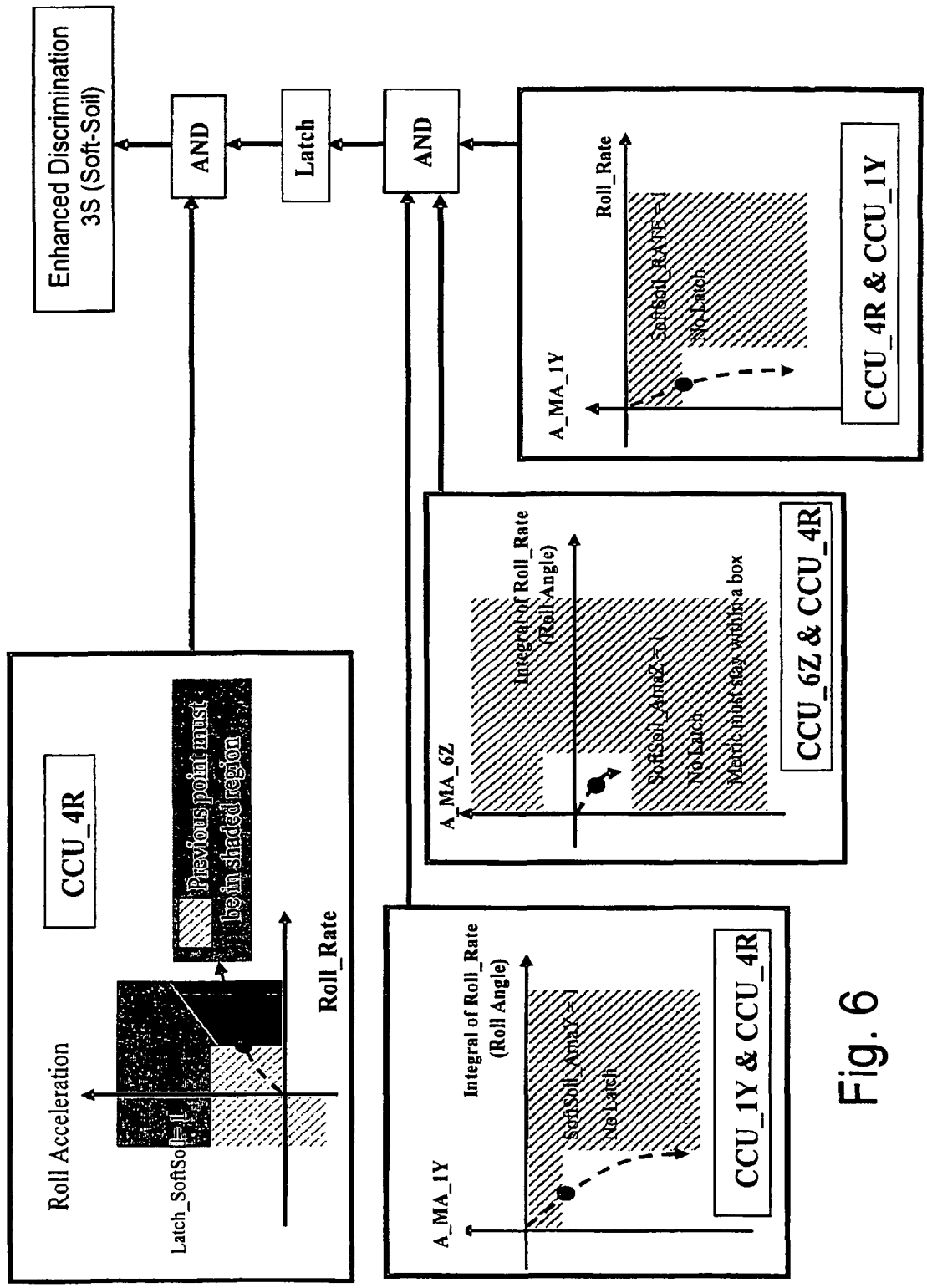
Figure 7:
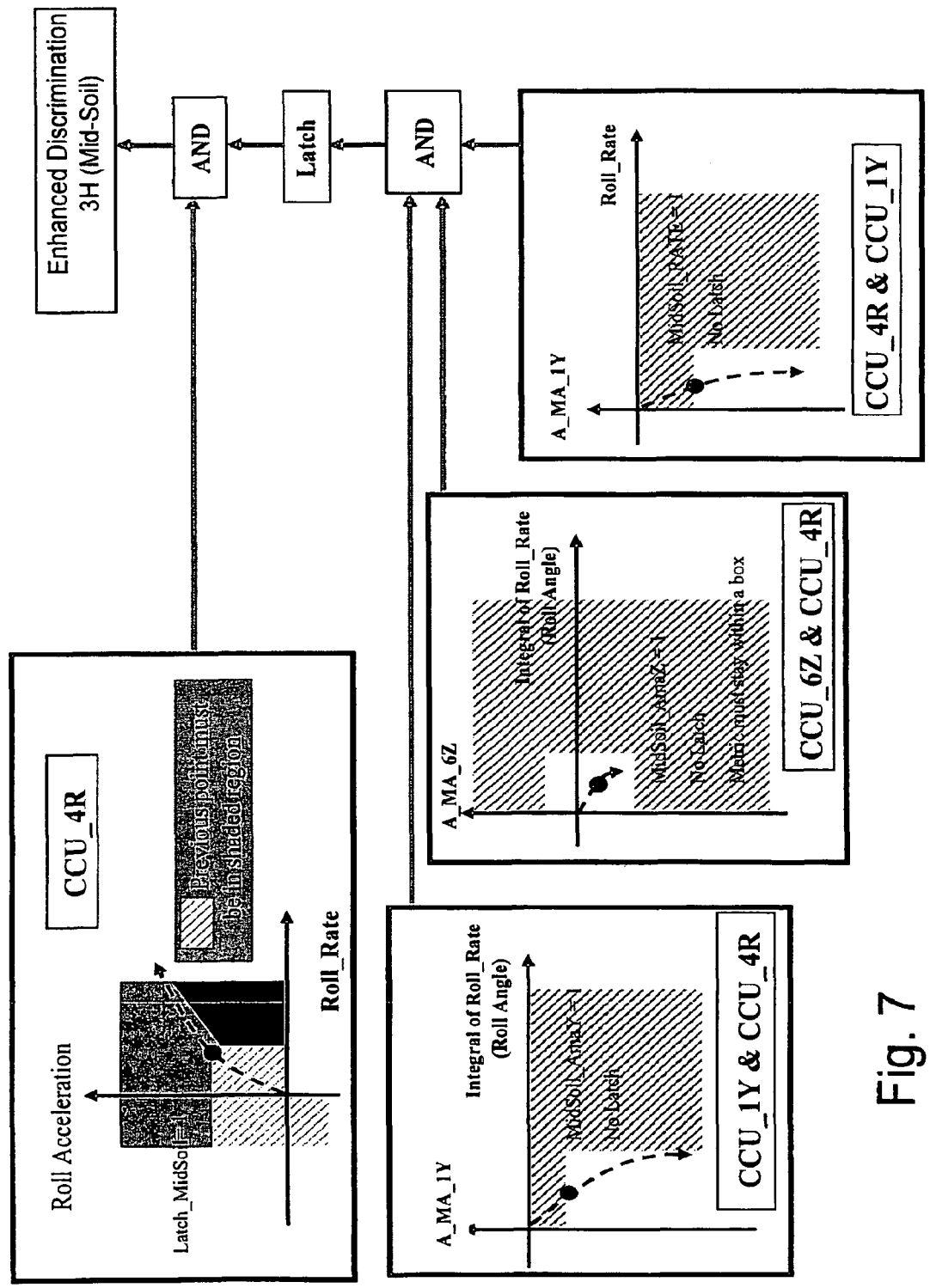
Figure 8:
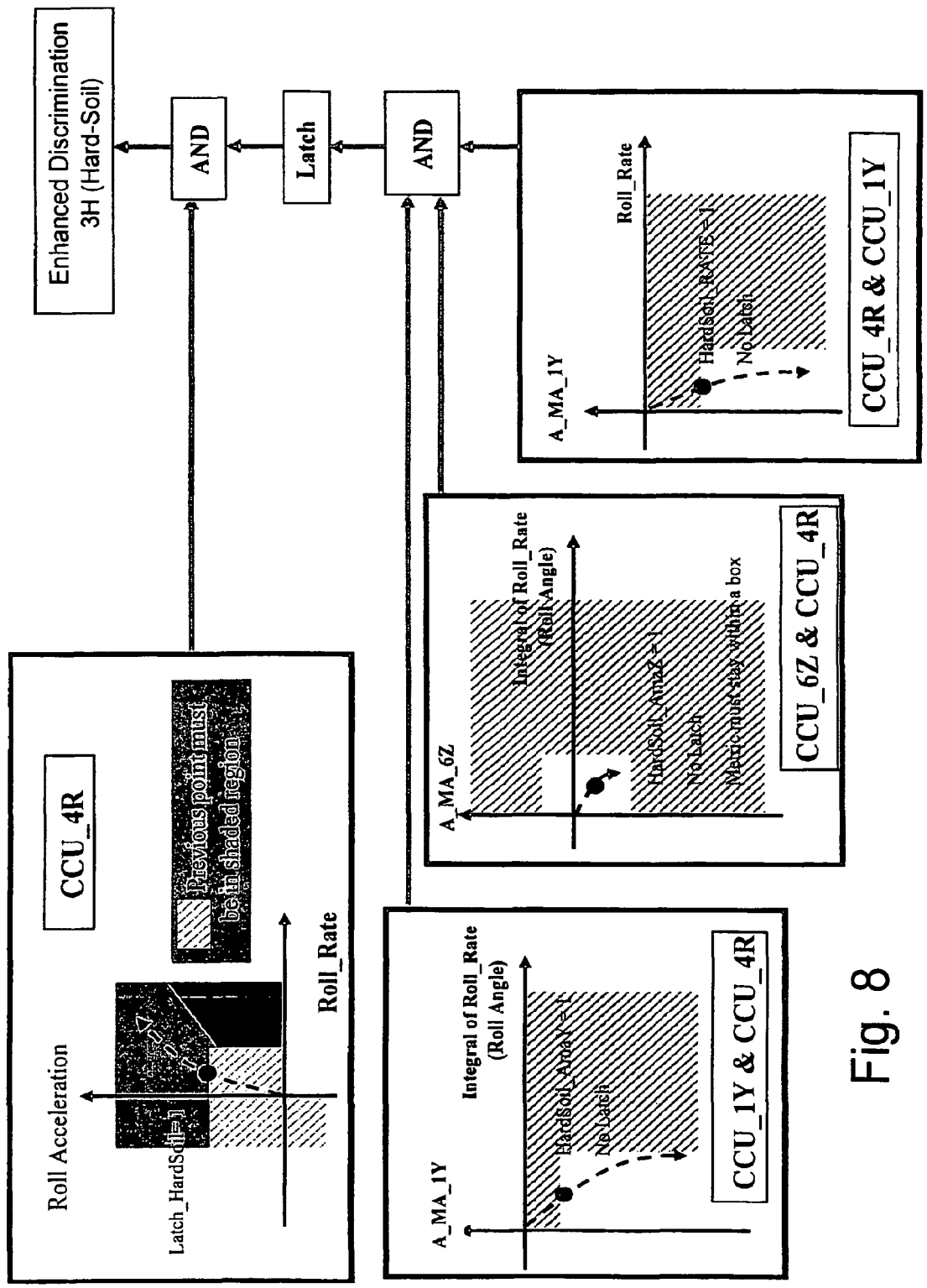
Figure 9:
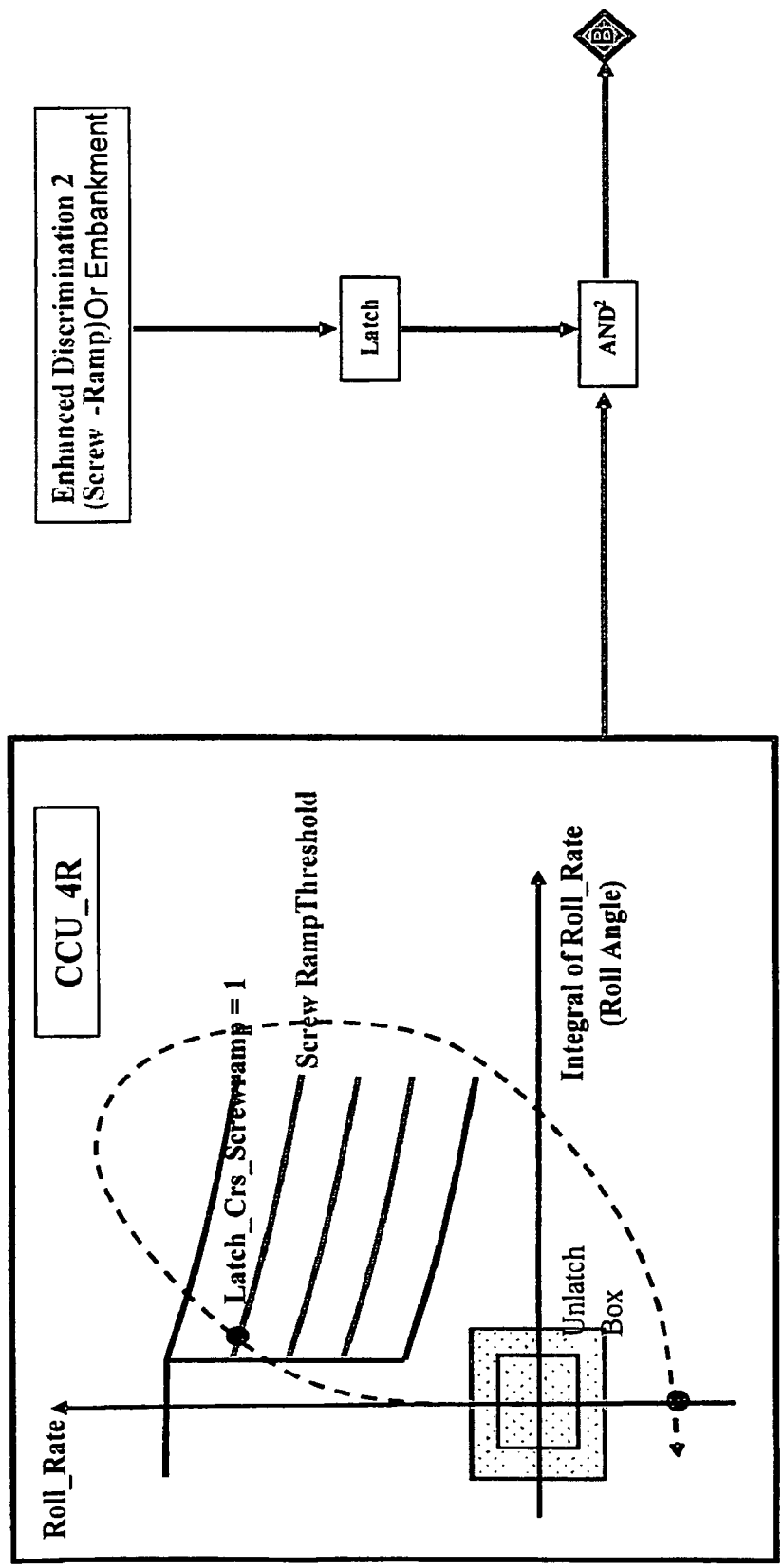

CCU_1Y 54 has a moving average determined in 102 and a moving average of CCU_6Z 58 is determined in 104. Next, a determination is made in function 120 whether a screw ramp or embankment condition is determined based on the moving average values of CCU_4R, CCU_1Y and CCU_6Z. How this is down is best appreciated from FIGS. 4 and 5. If the conditions in FIG. 4 or if the conditions in FIG. 5 are satisfied (metric must stay within the un-shaded boxes) then 120 will be HIGH. The 120 is HIGH, the condition will latch. Both the condition from 110 and 120 must be HIGH for "B" to be HIGH. The final condition need for "B" to be HIGH is shown in FIG. 9.

Figure 10:
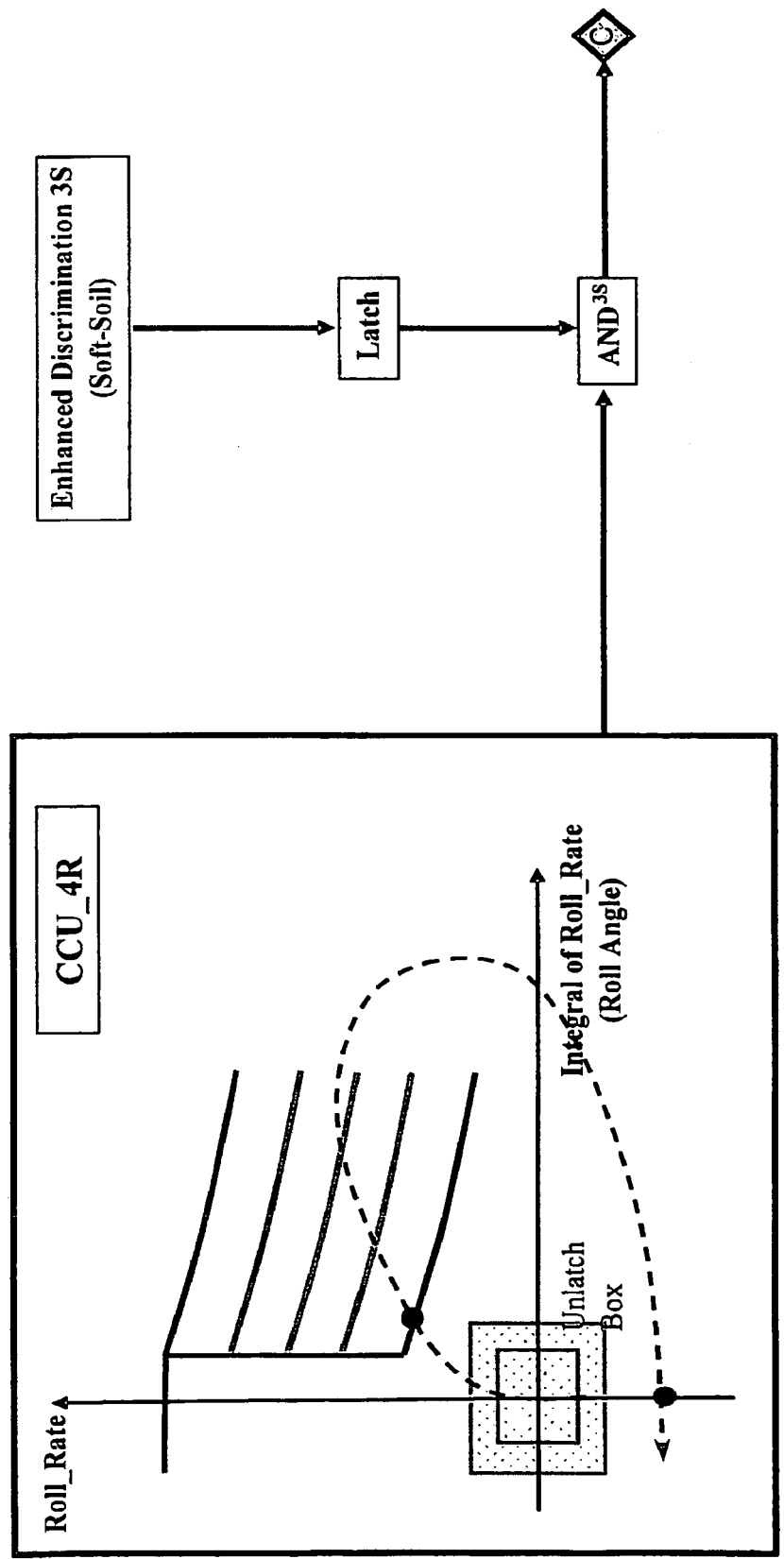

Next, a determination is made in function 130 whether a HMS-soil trip splitting function is determined based on the moving average values of CCU_4R. How this is down is best appreciated from FIG. 10. If the conditions in FIG. 10 are satisfied, then 130 will be HIGH. When 130 is HIGH, the condition will latch and "C" will be HIGH.

Next, a determination is made in function 140 whether three separate conditions are satisfied or true. All three are determined based on the moving average values of CCU_4R, CCU_1Y and CCU_6Z. First monitors for an enhanced discrimination 3S for a soft-soil trip condition. This will be understood from FIG. 7. The three monitored conditions all have to be true or HIGH (metric must stay in un-shaded region) for the condition to be true and for a HIGH output to latch. This is needed for "C" to be HIGH. The final condition need for "C" to be HIGH is shown in FIG. 10.

Figure 11:
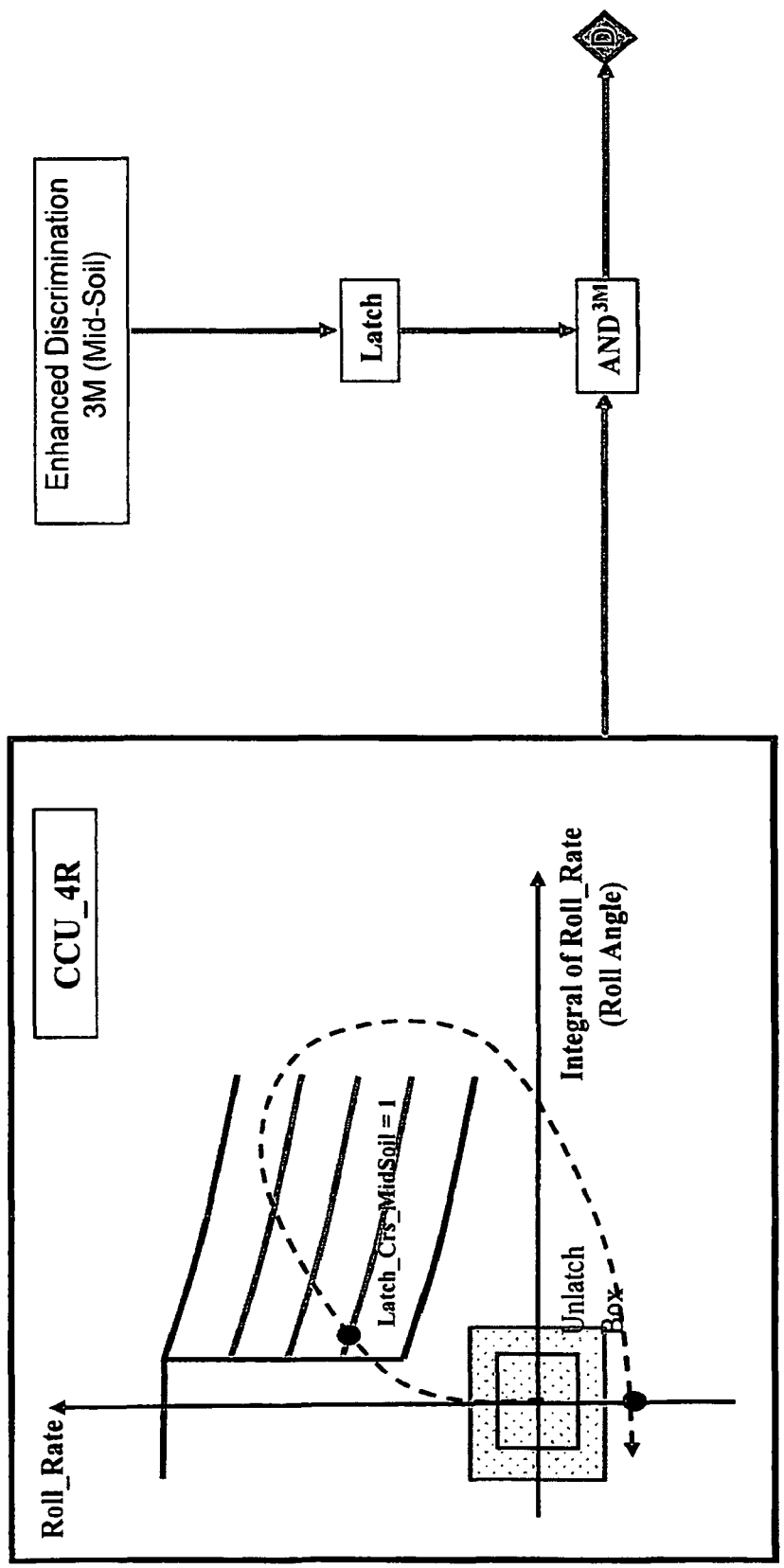

Next monitors for an enhanced discrimination 3M for a mid-soil trip condition. This will be understood from FIG. 8. The three monitored conditions all have to be true or HIGH (metric must stay in un-shaded region) for the condition to be true and for a HIGH output to latch. This is needed for "D" to be HIGH. The final condition need for "D" to be HIGH is shown in FIG. 11.

Figure 12:
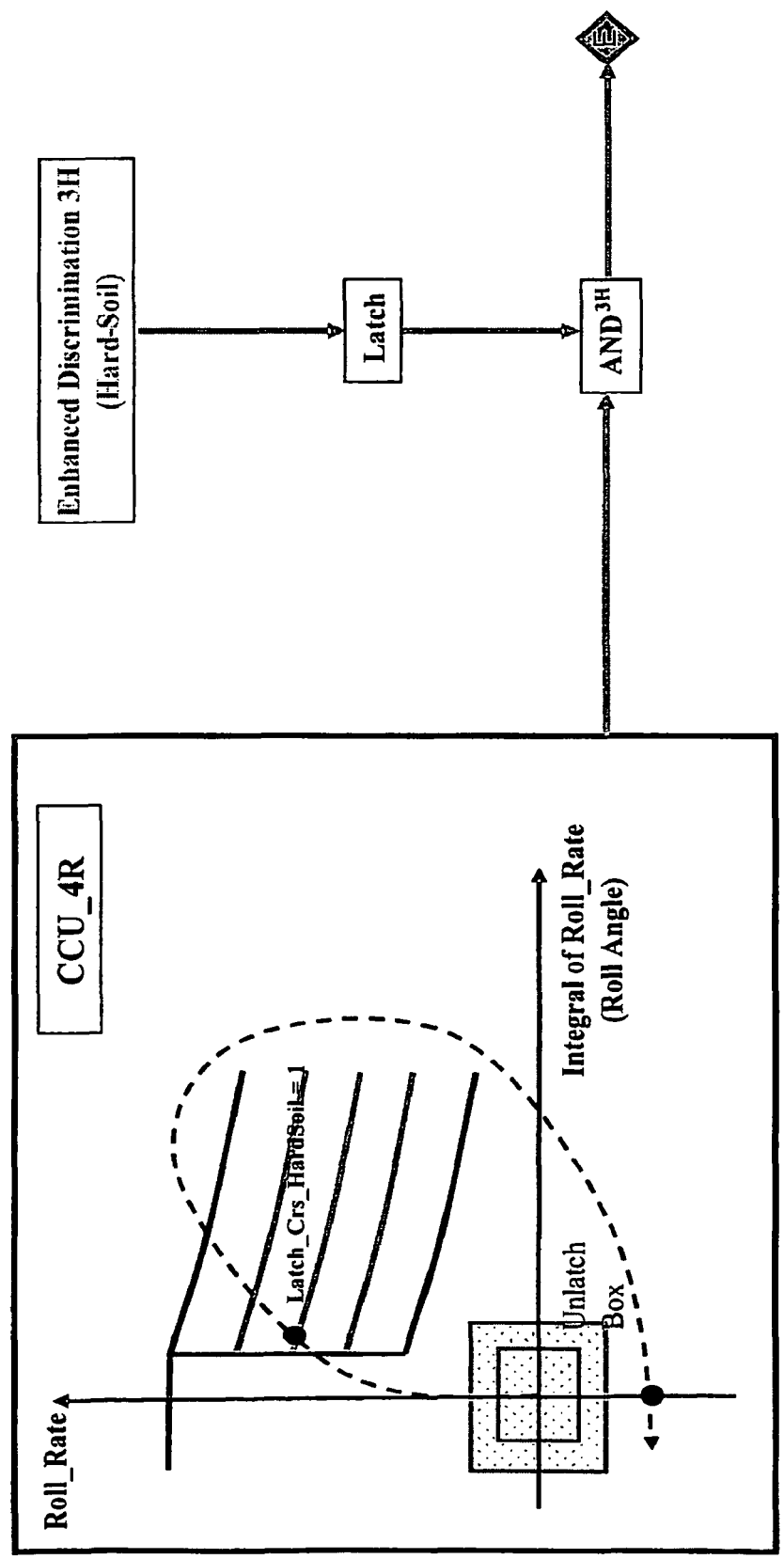

Next, monitors for an enhanced discrimination 3H for a hard-soil trip condition. This will be understood from FIG. 9. The three monitored conditions all have to be true or HIGH (metric must stay in un-shaded region) for the condition to be true and for a HIGH output to latch. This is needed for "E" to be HIGH. The final condition need for "E" to be HIGH is shown in FIG. 12.

Figure 13:
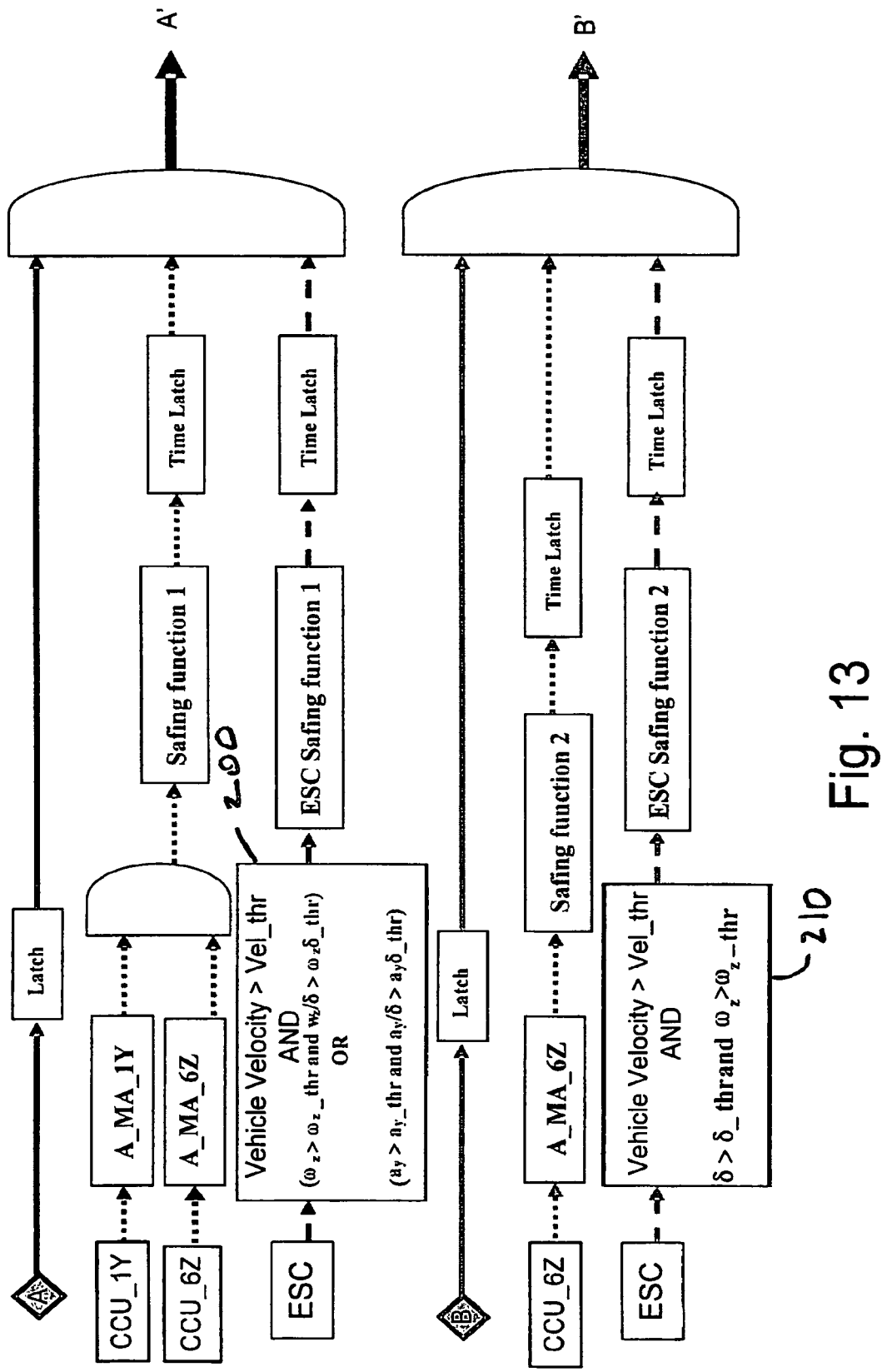
Figure 14:
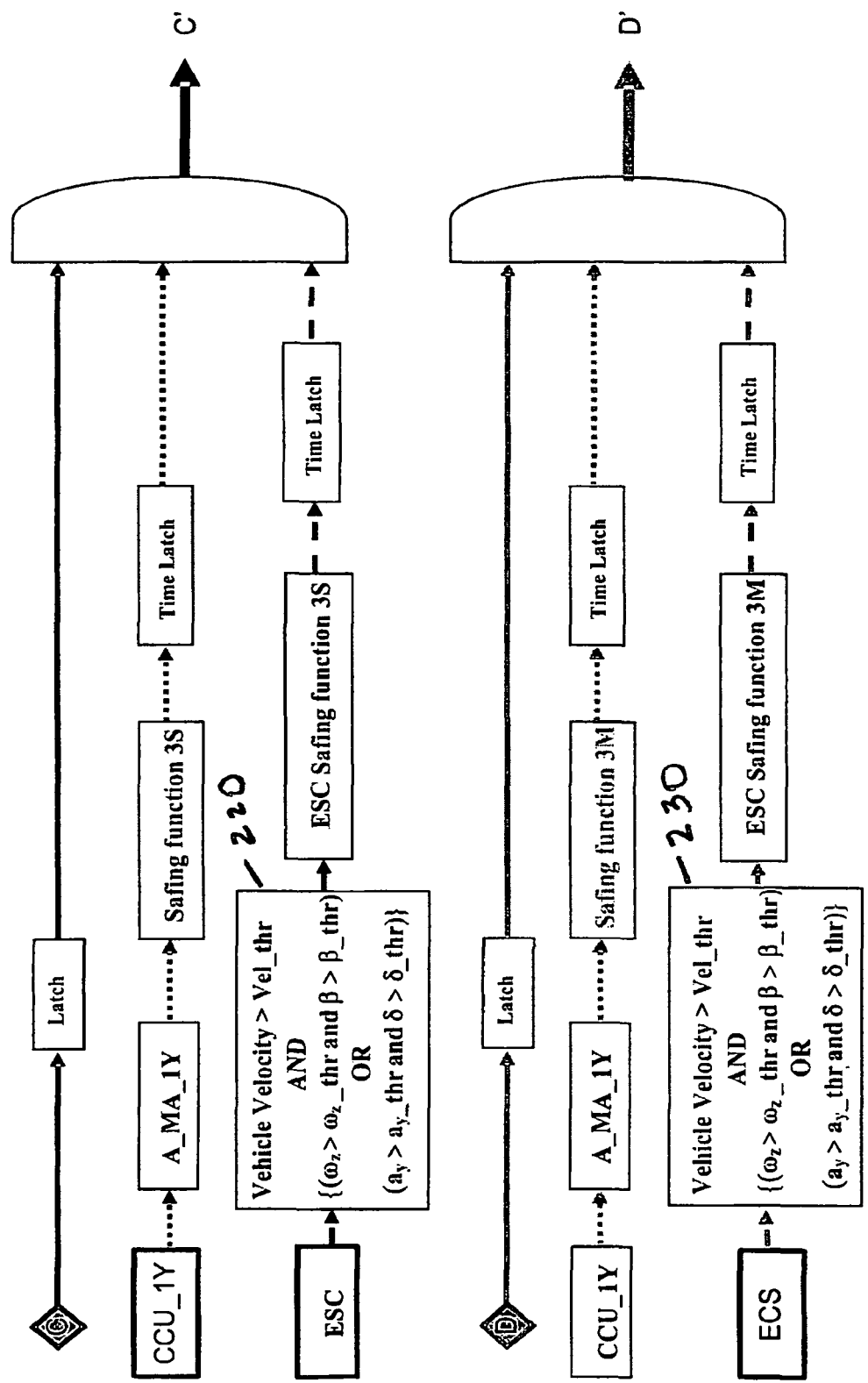
Figure 15:
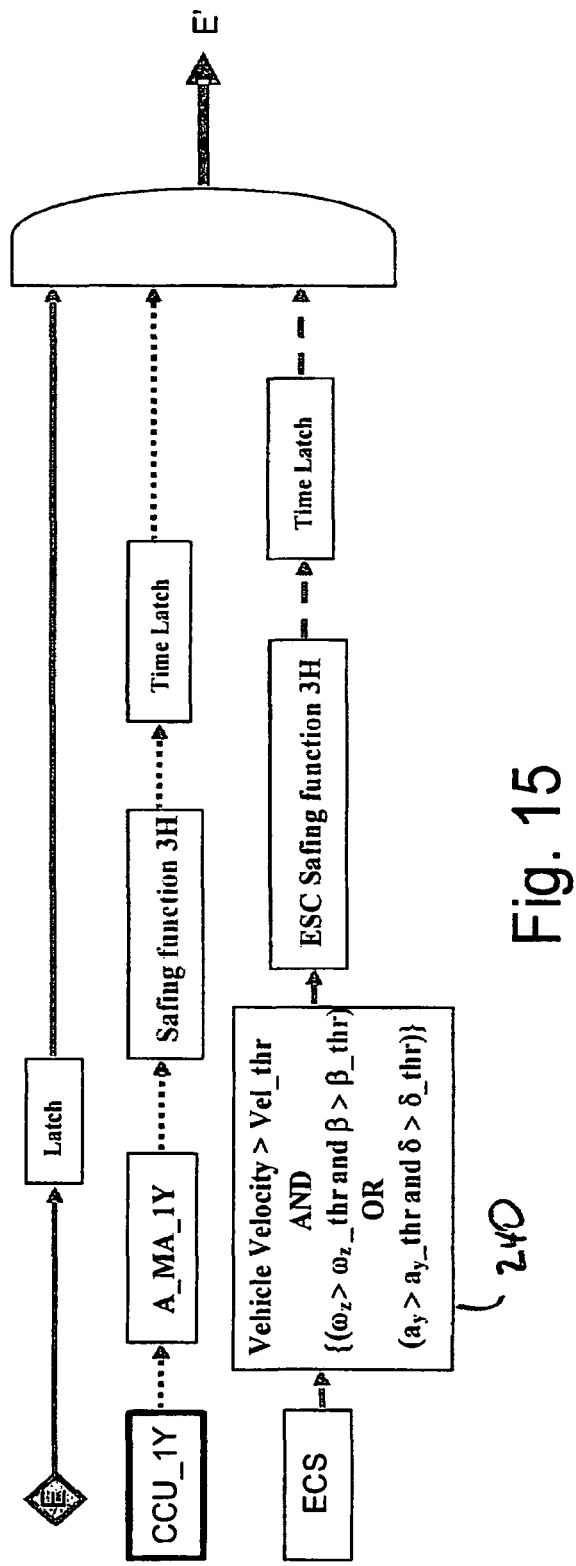

Referring to FIGS. 13-15, the enhanced inputs from the electronic stability control system combined with the rollover system will be appreciated. Referring to FIG. 13, the moving averages of CCU_1Y and CCU_6Z are compared against associated thresholds and are ANDed as a safing function with the "A" condition being used as a discrimination function, i.e., A=HIGH being a deployment condition. The values from the ESC system are then subject to the logic shown in function 200, i.e., the vehicle velocity has to be greater than a velocity threshold value AND $(((\omega_z > \omega_z\_thr)$ and $(\omega_z/\delta > \omega_z\delta\_thr))$ OR $((a_y > a_y\_thr)$ and $(a_y/\delta\_thr)))$. If all of these conditions are true, then A' will be HIGH.

Referring to FIG. 13, the moving average of CCU_6Z is compared against an associated threshold and is ANDed as a safing function with the "B" condition being used as a discrimination function, i.e., B=HIGH being a deployment condition. The values from the ESC system are then subject to the logic shown in function 210, i.e., the vehicle velocity has to be greater than a velocity threshold value AND $\delta > \delta\_threshold$ AND $\omega_z > \omega^z\_threshold$. If all of these conditions are true, then B' will be HIGH.

Referring to FIG. 14, the moving average of CCU_1Y is compared against an associated threshold and is ANDed as a safing function with the "C" condition being used as a discrimination function, i.e., C=HIGH being a deployment condition. The values from the ESC system are then subject to the logic shown in function 220, i.e., the vehicle velocity has to be greater than a velocity threshold value AND $(((\omega_z > \omega_z\_thr)$ and $(\beta > \beta\_thr))$ OR $((a_y > a_y\_thr)$ and $(\delta > \delta\_thr)))$. If all of these conditions are true, then C' will be HIGH.

Referring to FIG. 14, the moving average of CCU_1Y is compared against an associated threshold and is ANDed as a safing function with the "D" condition being used as a discrimination function, i.e., D=HIGH being a deployment condition. The values from the ESC system are then subject to the logic shown in function 230, i.e., the vehicle velocity has to be greater than a velocity threshold value AND $(((\omega_z > \omega_z\_thr)$ and $(\beta > \beta\_thr))$ OR $((a_y > a_y\_thr)$ and $(\delta > \delta\_thr)))$. If all of these conditions are true, then D' will be HIGH.

Referring to FIG. 15, the moving average of CCU_1Y is compared against an associated threshold and is ANDed as a safing function with the "E" condition being used as a discrimination function, i.e., E=HIGH being a deployment condition. The values from the ESC system are then subject to the logic shown in function 240, i.e., the vehicle velocity has to be greater than a velocity threshold value AND $(((\omega_z > \omega_z\_thr)$ and $(\beta > \beta\_thr))$ OR $((a_y > a_y\_thr)$ and $(\delta > \delta\_thr))))$. If all of these conditions are true, then E' will be HIGH.

Referring to FIG. 16, the final deployment control logic is shown in which A', B', C', D', and E' are connected to OR function 260. If any of the outputs A'-E' are HIGH, the actuatable restraints in the vehicle 30 will be activated. Those skilled in the art will appreciate that not all restraints need be actuated at once but that a single actuation is shown only as a simple example. The present invention contemplates actuations of multiple devices at different times during the crash event using mapping techniques previous developed by the inventors. The teachings of U.S. Pat. No. 6,433,681, and U.S. Pat. No. 6,600,414 and U.S. Pat. No. 6,439,007, and U.S. Pat. No. 6,186,539 and U.S. Pat. No. 6,018,693 and U.S. Pat. No. 5,935,182 are all hereby incorporated herein by reference.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting a vehicle rollover event comprising:
   an enhanced sensor input architecture for detecting a vehicle rollover event; and
   a controller responsive to the enhanced sensor input architecture for controlling an occupant restraining device,
   wherein the enhanced sensor input architecture includes electronic stability control sensors and vehicle roll-over sensors, the vehicle rollover sensors monitoring roll rate value, said controller determining roll angle from the monitored roll rate value and determining if a roll rate value as a function of the determined roll angle is greater than a threshold value, said controller controlling an actuatable restraining device in response to the determination of the roll rate value as a function of roll angle value against the threshold and in response to the electronic stability control sensors.

2. The apparatus of claim 1 wherein the electronic stability control sensors include at least one of a vehicle velocity sensor, a steer angle sensor, a side slip angle sensor, a yaw rate sensor and a lateral acceleration sensor.

3. The apparatus of claim 1 wherein the vehicle rollover sensors include a vehicle rollover sensor, a Y-axis sideways accelerometer, and a Z-axis accelerometer.

4. A method for detecting a vehicle rollover event comprising the steps of:
   monitoring vehicle roll rate value;
   determining roll angle from the monitored roll rate value;
   monitoring lateral acceleration of the vehicle;
   determining if the lateral acceleration of the vehicle exceeds a value;
   determining if a rollover condition is likely in response to the monitored lateral acceleration and a comparison of the roll rate value as a function of roll angle against a threshold value and outputting a first determination signal in response thereto;
   monitoring an electronic stability control system of the vehicle;
   determining if the electronic stability control system indicates a vehicle rollover condition and output a second determination signal; and
   controlling an actuatable restraining device in response to the first and second determination signals.

* * * * *